Nov. 22, 1960 C. W. DAVIS 2,960,973
FUEL IGNITION SYSTEM
Filed April 7, 1958 3 Sheets-Sheet 1
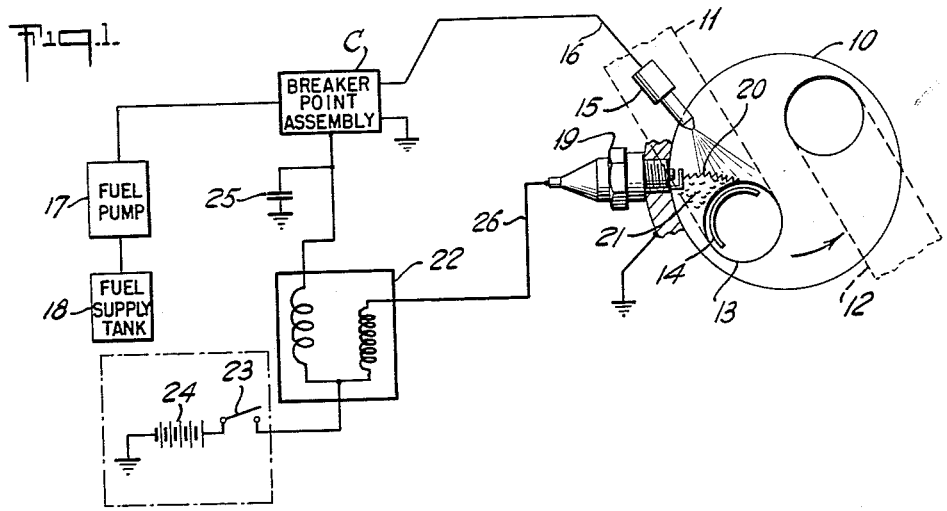
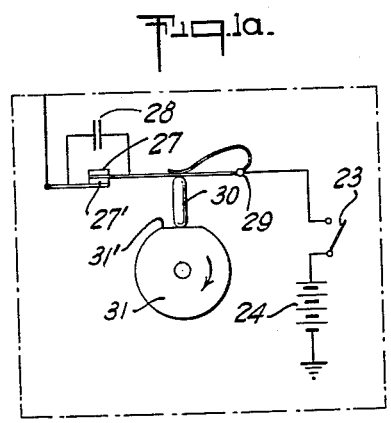
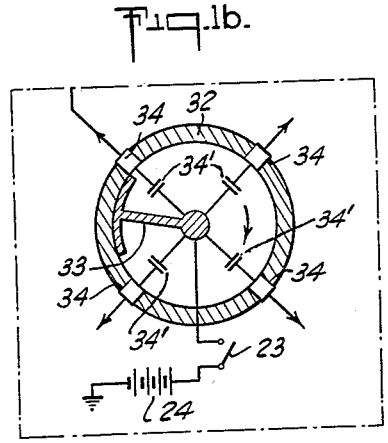
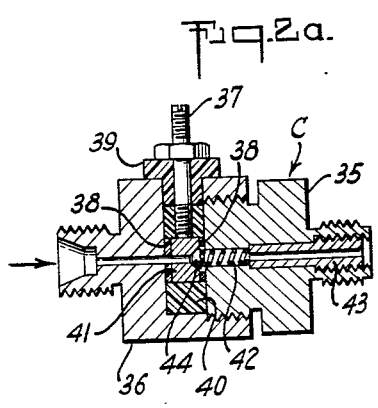
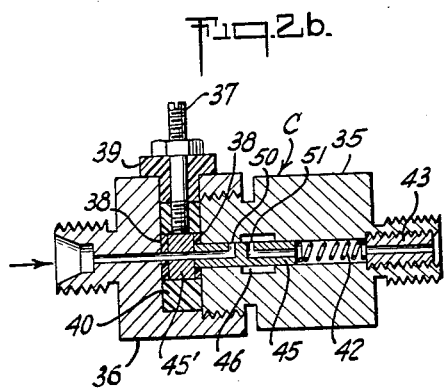

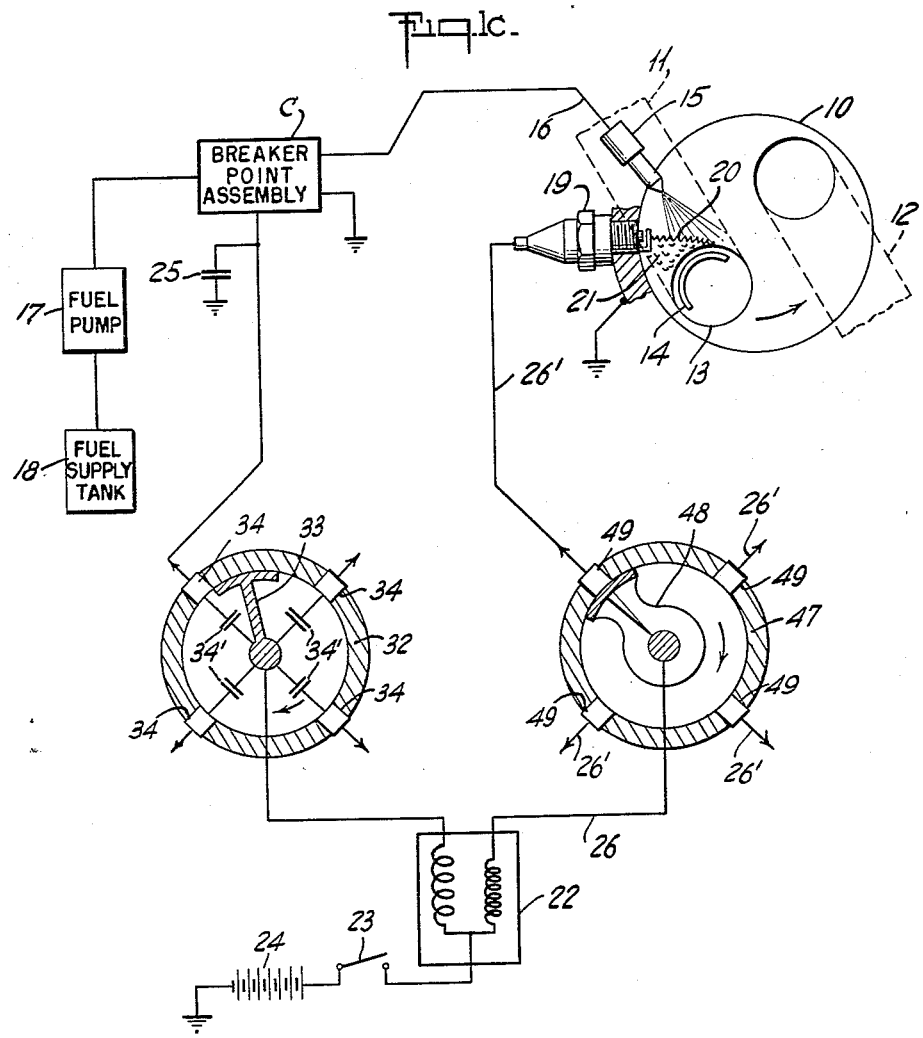
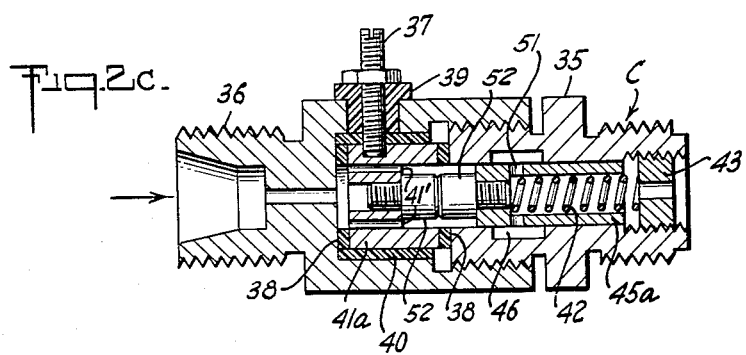

Fig. ld.
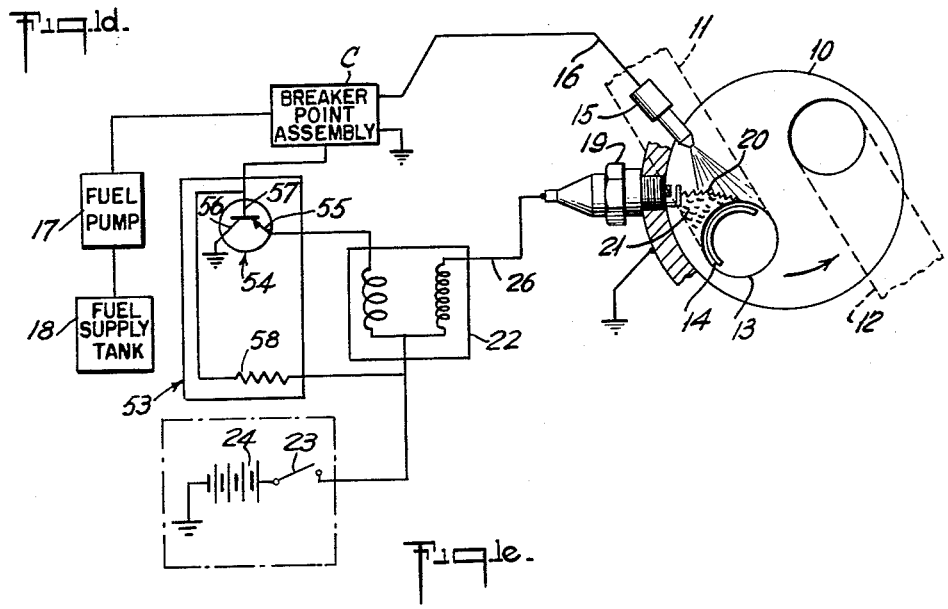
Fig. le.
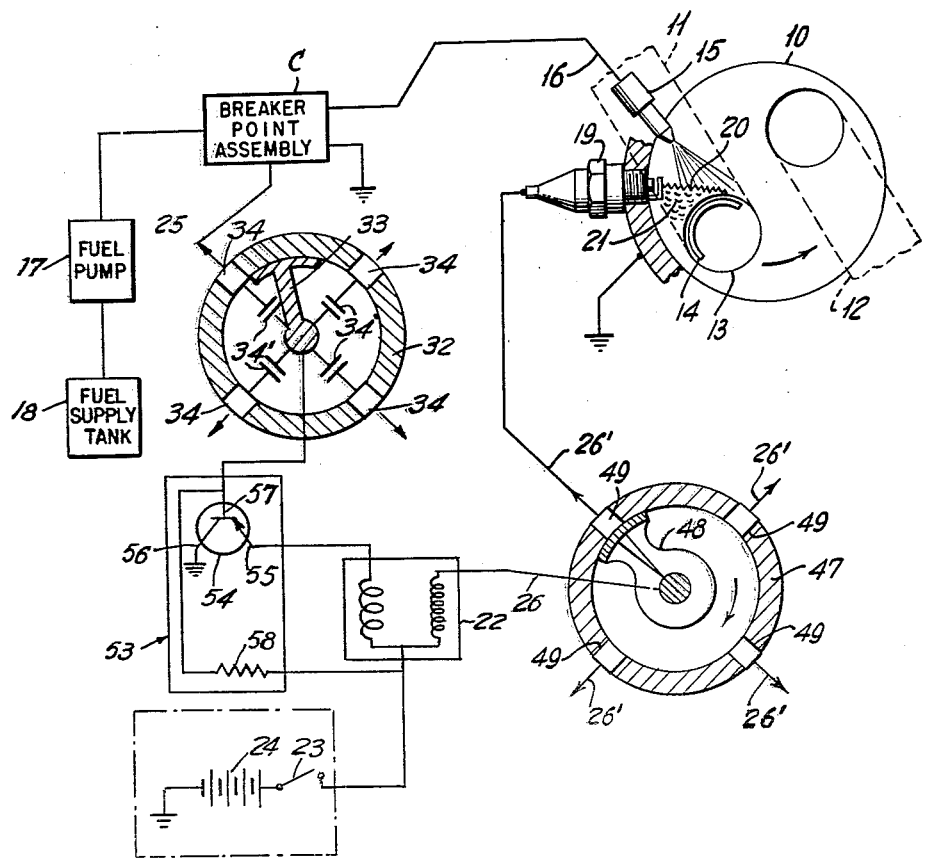

United States Patent Office 2,960,973
Patented Nov. 22, 1960

2,960,973
FUEL IGNITION SYSTEM

Charles W. Davis, Fishkill, N.Y., assignor to Texaco Inc., a corporation of Delaware Filed Apr. 7, 1958, Ser. No. 726,801

32 Claims. (Cl. 123—32)

This invention relates generally to an ignition system in an internal combustion engine, and specifically to the combination of a spark ignition system with a fuel injection system, as disclosed generally in U.S. Patent No. 2,718,883 granted to C. F. Taylor on September 27, 1955, and is particularly useful when applied to the improved combustion process disclosed in U.S. Patent No. 2,484,009, granted to E. M. Barber on October 11, 1949, both these patents and the application having a common assignee.

In the improved combustion process, oxidizing gas (or air) is caused to swirl around an engine cylinder during the compression stroke, at a predetermined rate with respect to the speed of the engine. Fuel to be burned in the engine cylinder is injected under pressure during each cycle of engine operation. The injected fuel is formed into a patch of combustible mixture, which is confined in one direction by oxidizing gas (or air) swirling toward the patch and containing little or no vaporized fuel so that it is incombustible; and, on the other side, by gaseous products of combustion traveling away from a flame front at the edge of the patch, where the mixture is burned substantially as fast as it is formed, so that combustion is confined to and completed at the leading edge of the patch. Thus, during each cycle of engine operation, a patch of combustible mixture is formed progressively and consumed in a localized area of the cylinder.

In this improved combustion process, the first increment of the fuel which is injected into the cylinder should be ignited as soon as it mixes with the oxidizing gas (or air) to form a combustible mixture. To accomplish this, a portion of the incendiary life of the ignition spark must coincide with the time of initial mixture formation, and since the duration of the spark is limited, it is a requisite that the spark be timed relative to the beginning of injection. In practice, the spark timing (beginning of the spark) should be maintained within the range from about 5 crank angle degrees before the beginning of injection to about 5 crank angle degrees after the beginning of injection. This can be done with conventional mechanically driven ignition systems rather easily, if injection timing is relatively constant for all conditions of engine operation. However, if injection timing is variable with engine speed and load to the extent that some portion of the life of a fixed timing spark from a conventionally actuated ignition system will no longer coincide with the beginning of injection at all speeds and loads, means must be introduced to cause spark timing to vary in the same manner as injection timing. The provision of such mechanical automatic spark timing means is complicated, particularly in the case of a variation of timing with engine load, and makes operation of the engine less reliable. It is common for injection timing in the patented non-knocking internal combustion engine to vary an amount such that adjustment of spark timing is required because of optimum injection timing requirements, or because variations of timing are inherent in the operation of certain types of injection pumps.

The above cited U.S. Patent No. 2,718,883 to C. F. Taylor in part discloses means for using fuel pressure in the injection system to actuate the ignition system breaker points and thus cause the spark to occur. The fuel pressure in an injection system increases from a relatively low value to a relatively high value as injection occurs, and then decreases again to a low value as pumping ceases or injection terminates. The increase in pressure which occurs just prior to and during the early stages of injection is used to actuate the ignition system. When such an ignition system is used with the patented non-knocking internal combustion engine, spark timing always will be timed properly with respect to the beginning of injection regardless of changes in injection timing, and without the use of any special timing apparatus which would be required in the case of a conventional mechanically actuated ignition system. The disclosure of the above cited patent may be applied to any type injection system. In general, this patent shows a set of pressure actuated breaker points used for each cylinder.

I propose to use a similar device where the ignition breaker points are built into a check valve which is installed in the high pressure injection line and therefore actuated by the beginning of fuel flow in the injection line, which occurs with the initial rise in injection pressure.

Accordingly, it is an object of my invention to provide a new and improved ignition system which is actuated by fuel flow.

It is another object of the invention to provide a novel ignition system wherein spark occurrence for any cylinder is controlled by the occurrence of fuel injection to such a cylinder.

Still another object of the invention is to provide an ignition system wherein spark timing is related to the beginning of fuel injection independent of changes in injection timing.

And still another object of invention is to provide an improved ignition system for use in a non-knocking internal combustion engine in which the sparking is actuated by the pressurized fuel in the fuel injection system.

Other objects and advantages of this invention will become apparent from a reading of the specification detailing a description of the structure illustrated in the accompanying drawings in which;

Fig. 1 is a diagrammatic showing of my improved ignition system, partly in section, as employed in an internal combustion engine;

Figs. 1a and 1b are partial sectional views showing alternate electrical arrangements for control of the ignition system;

Fig. 1c is a diagrammatic showing, partly in section, of still another alternate electrical control arrangement for the improved ignition system;

Figs. 1d and 1e show additional alternate electrical arrangements, wherein an electronic circuit provides the energy for the spark; and Figs. 2a, 2b and 2c are cross-sectional views of check valves used as circuit breakers.

In accordance with my invention ignition timing is controlled by means located in the fuel injection system, and so, responsive to actuation by flow of fuel in the system, so that the timing of ignition is synchronized with the injection of fuel rather than being synchronized with crankshaft movement.

The engine illustrated in Fig. 1 is a four cycle engine of the general type described in the above cited U.S. Patent No. 2,484,009.

The engine comprises a cylinder 10, with intake and exhaust passages 11 and 12 respectively, the ports of which are closed by poppet valves, with the poppet valve 13, closing the inlet port in the cylinder head, and being provided with a semi-circular shroud 14 on its upstream side. The shroud is so placed that it causes the incoming oxidizing gas or air to swirl around the axis of the cylinder, as it is drawn in on the intake stroke.

A fuel injector nozzle 15 projects into the combustion chamber in the cylinder above the top dead center position of the piston and sprays fuel into the chamber to impregnate a segment of the swirling air stream located at one side of a diameter of the cylinder to form a patch of combustible mixture. The spray is directed downstream and across the swirling air stream, and the rate of injection is correlated with the velocity and density of the swirling air so as to impregnate the air at a controlled fuel-air weight ratio.

The nozzle is connected by a conduit 16 to a fuel pump 17, which is supplied with fuel from a supply tank 18, by a transfer pump, not shown. The conduit includes the check valve breaker point assembly, indicated generally as C, and shown in detail in Figs. 2a, 2b and 2c. In practice, it is advisable to locate the breaker point assembly as close to the fuel injector as possible.

A spark plug 19 is provided for igniting the combustible mixture within the cylinder and is located downstream from the injector nozzle 15. The spark plug is positioned to ignite the first increment of the combustible mixture as soon as it is formed, and the ignition system is arranged to provide an electric spark between the electrodes of the spark plug so as to effect such ignition. Once the fuel is ignited by the electric spark, the flames of the burning fuel ignite the remainder of the fuel which is injected during the combustion period.

If the timing of the ignition system is properly correlated with the injection of the fuel, a flame front 20 is formed during each combustion period. This flame front is located at the front of the patch of combustible mixture, and it serves to burn the mixture substantially as fast as it is formed. The flame front tends to travel in a direction counter to that of the swirling air mass and toward the locus of fuel injection. The combustion products 21 travel in the direction of the swirling air away from the flame front. The patch of combustible mixture is thus confined on one side by an incombustible layer of the combustion products swirling away from the patch and on the opposite side by an incombustible layer of air into which no fuel has yet been injected or which does not yet contain enough vaporized fuel to form a combustible mixture. Under such conditions, substantially no "end gases" are formed, and even if formed, do not attain a temperature and pressure for a sufficient length of time to result in spontaneous ignition. Consequently "ping" or "knock" is inhibited, even with fuels of low anti-knock value at high compression ratios.

The primary winding of a transformer or coil 22, an ignition switch 23 and a battery 24, are connected in series with the breaker point assembly C, with condenser 25 connected across the breaker points, in accordance with conventional ignition techniques.

The transformer 22 is of conventional type, having a low voltage primary winding and secondary winding which provides a high voltage current when the circuit through the primary winding is interrupted. The output of the secondary winding is connected to the spark plug of the engine through lead 26.

As the check valve in the breaker point assembly C opens and closes, a high voltage current is produced across the electrodes of the spark plug each time that the breaker contacts therein are caused to open, due to the action of the transformer 22, the battery 24 and the condenser 25.

With the electrical arrangement of Fig. 1, the circuit through the primary winding of the coil will be completed at all times except when injection is occurring and the breaker points are open. This results in a relatively long charging time for the coil and imposes unusual thermal stresses on the coil. If the characteristics of the coil are such as to result in overheating, it becomes necessary to provide means for limiting the time of closed circuit to a reasonable value. This may be accomplished by the alternate electrical arrangements disclosed in Figs. 1a, 1b and 1c.

Referring to Fig. 1a, a set of circuit limiting breaker point contacts 27, 27', is provided for the ignition system, and these may be interconnected by the condenser 28, if required to suppress contact arcing.

Contact 27 is appropriately spring loaded and pivoted at 29 and supports a cam follower 30, which rides over the interrupted surface 31' of the cam 31. The arrangement is completed with the switch 23 and battery 24. One set of such circuit limiting contacts is required for each cylinder of the engine.

Fig. 1b discloses a brush type low voltage commutator 32 which can be substituted for the individual sets of circuit limiting contacts in a multi-cylinder engine. The commutator 32 includes the rotor 33, which is connected through switch 23 to a source of power, i.e., a battery at 24, and a series of contacts 34, equal in number to the cylinders of the engine and connected to the respective primary winding of the coil for each cylinder. In this manner, the individual circuit limiting breaker points 27, 27', for each cylinder are replaced by the commutator rotor 33 and the contacts 34. Note that the contacts 34 may be interconnected with the rotor 33 by the condensers 34', depending on their material of construction and the requirement to suppress contact arcing.

In the alternate arrangements of the ignition systems so far described, a separate coil and separate check valve breaker point assembly are required for each cylinder of the engine.

Fig. 1c discloses an electrical arrangement which eliminates the requirement for a separate coil for each cylinder, employing the same low voltage commutator disclosed previously in Fig. 1b, to limit the coil circuit closed time, in combination with a conventional high voltage ignition distributor. This arrangement enables the use of a single coil for a multi-cylinder engine. Reference to Fig. 1c will show the same numeration for the same elements which occur in Figs. 1 and 1b. A conventional high voltage distributor is disclosed at 47 being connected to the high voltage coil by line 26. The rotor of this distributor is at 48 and makes contact with the separate terminals indicated at 49, with leads 26' therefrom to the individual spark plugs.

In this case, the commutator or closed circuit time limiting device serves as a primary circuit switching device which successively connects and disconnects each check valve breaker point assembly with the ignition coil in turn. This device may be either multiple cam operated breaker points or a segment commutator with brush contacts, the latter being shown in Fig. 1c for a 4-cylinder engine. Both commutator and distributor are driven from a common shaft by the engine.

Typical timing requirements for the commutator and distributor arrangements disclosed in Figs. 1a, 1b and 1c can be stated as follows:

(1) The low voltage commutator or contact apparatus must close the circuit to each check valve circuit breaker sufficiently prior to the time of the spark to allow the primary current in the coil to reach a sufficiently high value;

(2) The low voltage commutator must open each primary circuit to the check valve breaker shortly after the time of spark discharge;

(3) The low voltage commutator in Fig. 1c may close the circuit for the next cylinder before opening the circuit for the preceding cylinder, but must not do so prior to the time the spark occurs in the preceding cylinder and the coil is discharged;

(4) The rotor of the high voltage distributor must be aligned with the terminal to the appropriate cylinder spark plug at the time the check valve breaker contacts for the cylinder open, and it must continue to be so aligned until a spark discharge is completed. At the same time, it must be sufficiently remote from the other terminals to prevent sparking thereto.

These are the usual requirements for a high voltage ignition distributor.

Referring now to Figs. 2a and 2b, showing in detail the construction of the check valve breaker point assembly, the former figure depicts a ball check valve and the latter figure a sliding piston type check valve wherein more extended valve motion provides a greater separation of the breaker points. In both structures, the valve seat or valve stop is insulated electrically from the rest of the assembly but has electrical contact with an external terminal.

Each check valve breaker point assembly includes a two piece body 35, 36, housing the check valve circuit breaker, comprising the terminal screw 37, insulating collar 39 and insulating bushing 40. The bushing has a recess for receiving the valve seat 41, Fig. 2a or valve stop 45', Fig. 2b, sandwiched between a pair of insulating washers 38. Body half 35 has an axial bore for housing the seating spring 42 and the spring stop screw 43. In Fig. 2a, the check valve assembly is completed by the half ball check 44, and in Fig. 2b, the check valve assembly is completed by the sliding check valve or piston 45. The dimensions of the various parts of the assembly are such that the insulating washers and valve seat are compressed between the body halves on assembly, to be fuel tight under the high injection pressures involved.

When there is no fuel flow through the conduit 16, in which the check valve breaker point assembly is inserted, an electrical circuit is established through the terminal screw 37, through the valve seat 41 or valve stop 45' and then through either the half ball or sliding piston and seating spring to the body which is grounded, thus permitting the circuit to be included in an ignition system.

When injection starts, the valve will be lifted from the seat or stop, the electrical circuit interrupted and a spark discharged from the usual ignition induction coil. The circuit always will be opened as flow starts in the fuel line or conduit 16, and therefore, the spark always will occur at or near the beginning of fuel injection.

Note that the flow arrangement through the sliding piston valve is different than with the ball check valve. As fuel flow in the injection line starts, the piston valve is lifted off its stop and continues to move away from the stop until the upstream radial port 50 reaches the internal annular groove 46 in the body, at which point fuel can pass into the groove and then re-enter the valve through the downstream radial port 51 and continue on to the nozzle through conduit 16. This provides for a greater separation distance between the electrical contact points of the check valve, thus leading to a better, i.e., more abrupt, break and so extending the life of the breaker points.

With use of the sliding piston type valve, there will be a delay in valve closing (depending on the leakage characteristics around the piston) which will reduce the closed time of the coil circuit without any separate mechanism. During valve closing, when the upstream radial port 50 in the valve becomes covered, the fuel trapped on the upstream end of the valve will oppose further closing. Valve seating will occur only after this fuel has leaked downstream along the outside of the valve. Such time delay can be adjusted by regulating the clearance between the valve and the bore in the body.

In both Figs. 2a and 2b, the check valve construction involved in the breaker point action, viz., the valve seat or stop and half check or sliding piston valves, are shown generally, without any specific materials of construction indicated. Where problems of breaker point deterioration require specific materials, a modified sliding piston check valve breaker point assembly, as disclosed in Fig. 2c, may be used, with the identical elements disclosed in Figs. 2a and 2b bearing the same numeration.

The valve seat 41a has a number of drilled holes 41' for the passage of fuel, and into its downstream countersunk end, one of a pair of tungsten breaker points 52, is fastened, e.g., shown threaded, the width of the point allowing for the free passage of fuel through the drill holes. A corresponding tungsten breaker point 52 of the pair is fastened to the upstream end of the sliding piston 45a and is of such width as to allow for free passage of fuel. It should be evident that this check valve breaker point construction functions in the same manner as the sliding piston of Fig. 2b, the fuel passing through the drilled holes 41', past the separated breaker points into the annular groove 46 and then through the downstream radial port 51 into the conduit 16. By such construction the use of special high cost material is minimized without loss of efficiency.

The alternate electrical arrangements of the ignition system shown on Figs. 1d and 1e involve the use of electronic apparatus, generally designated as 53. This electronic apparatus is triggered to provide the electric energy for the spark at the appropriate time, by action of the check valve breaker point assembly at C operating in the same manner as previously described for Figs. 1, 1a, 1b, and 1c, with the same numeration for identical elements which now are connected to the electronic apparatus.

The electronic apparatus 53 consists of a transistor 54 of the P-N-P type having an emitter electrode 55, a collector electrode 56, a base electrode 57 and a bias resistor 58. The emitter electrode 55 is electrically connected to the primary terminal of the transformer 22, the collector electrode 56 is grounded and the base electrode 57 is connected to the breaker point assembly C and also to the other primary terminal of the transformer via the bias resistor 58.

When the breaker points in the assembly C are closed, the transistor is forward biased and a relatively small current flows in the base circuit consisting of the battery, the primary transformer winding and the emitter and base electrodes of the transistor. This current flowing within the transistor causes a relatively large current to flow in the circuit made by the battery, the primary transformer winding and the emitter and collector electrodes of the transistor. When the breaker points in the assembly C are opened by the fuel injection process, the transistor is back biased and the current through the primary winding of the transformer drops to substantially a zero value causing a high voltage to be induced in the secondary winding of the transformer and a spark to occur at the spark plug electrodes as described previously.

A major advantage of this arrangement is that the breaker points in the assembly C carry a much smaller current than in the previously described arrangements and therefore are less susceptible to burning and erosion. The transistor regulates the primary current flow and is "triggered" by the action of the breaker points in the assembly C. Electronic means to perform this service are generally well known in the art and other electronic apparatus may be substituted for the transistor arrangement disclosed herein.

The alternate closed circuit time limiting devices shown in Figs. 1a and 1b can be included in the circuit shown in Fig. 1d in the same manner as they may be applied to the circuit in Fig. 1, and with the same results.

Fig. 1d corresponds to Fig. 1 and shows a separate electronic apparatus for each engine cylinder.

Fig. 1e corresponds to Fig. 1c and shows only one electronic apparatus used with a high voltage distributor 47 operating in the same manner as described previously for Fig. 1c, with a low voltage commutator inserted in the circuit between the base electrode of the transistor and the breaker point assembly C.

Thus, there has been shown and described, breaker point construction utilizing a check valve which already may be in use in the injection system for other reasons.

Obviously, many modifications and variations of the invention as hereinbefore set forth may be made without departing from the spirit and scope thereof, and therefore, only such limitations should be imposed as are indicated in the appended claims.

What is claimed is:

1. A fuel ignition system for an internal combustion engine having a fuel injection system comprising a conduit and a set of breaker contacts housed therein, a spark plug having electrodes extending into the combustion chamber of a cylinder of said engine, and means, including an ignition coil, for causing an ignition spark between said electrodes when said set of breaker contacts is opened, joining said set of breaker contacts to said spark plug, said set of breaker contacts comprising check valve means responsive to the flow of fuel in said conduit of said fuel injection system.

2. In the fuel ignition system as defined in claim 1, said means for causing an ignition spark including electronic apparatus which is triggered when said set of breaker contacts is caused to open.

3. In the fuel ignition system as defined in claim 2, said means joining said set of breaker contacts to said spark plug including a high voltage distributor connected in series between the secondary winding of said ignition coil and said spark plug.

4. In the fuel ignition system as defined in claim 1, said means joining said set of breaker contacts to said spark plug including means for limiting the ignition coil circuit closed time.

5. In the fuel ignition system as defined in claim 4, said last mentioned means including a pair of breaker contacts in series with the primary winding of said ignition coil and a source of power, and cam means for interrupting the contact time of said pair of breaker contacts.

6. In the fuel ignition system as defined in claim 4, said last mentioned means comprising a commutator device including a rotor and a contact for interrupting the flow of power to the primary winding of said ignition coil.

7. In the fuel ignition system as defined in claim 6, said means joining said set of breaker contacts to said spark plug including a high voltage distributor connected in series between the secondary winding of said ignition coil and said spark plug.

8. In the fuel ignition system as defined in claim 4, said check valve means comprising a sliding piston type check valve assembly wherein said sliding piston valve and the valve seat therefor comprise said set of breaker contacts.

9. In the fuel ignition system as defined in claim 4, said check valve means comprising a ball type check valve assembly wherein the ball check valve and the valve seat therefor comprises the breaker contacts.

10. In a fuel ignition system as defined in claim 1, said check valve means controlling fuel flow by throttling action to provide for delay in valve closing thereby to increase the open time of said set of breaker contacts.

11. In the fuel ignition system as defined in claim 1, said check valve means comprising a ball type check valve assembly wherein the ball check valve and the valve seat therefor comprise said set of breaker contacts.

12. In an internal combustion engine having means for causing an oxidizing gas to swirl around in a cylinder of said engine during the compression stroke, the combination of an injection system for injecting fuel into a segment of swirling gas in said cylnder during a predetermined portion of the period required for said gas to complete one swirl, with an ignition system including a spark plug having electrodes extending into the combustion chamber of said cylinder and being located adjacent and downstream from the locus of fuel injection and a set of breaker contacts, and means including a source of power joining said contacts to said spark plug for causing an ignition spark between said electrodes of said spark plug when said contacts are caused to open, said set of breaker contacts being coupled to said injection system and comprising check valve means responsive to the flow of fuel therein whereby said contacts are caused to open so that a spark is provided for ignition of the first increment of fuel which is injected into said cylinder substantially as soon as it mixes with oxidizing gas to form a combustible mixture.

13. In an internal combustion engine as defined in claim 12, said means joining said contacts to said spark plug including means for limiting the coil circuit closed time.

14. In an internal combustion engine as defined in claim 13, said means for limiting the coil circuit closed time comprising a pair of breaker contacts joined in series with said source of power and with the primary coil winding of said coil circuit, and means for interrupting the closed contact time of said pair of breaker contacts including a cam.

15. In an internal combustion engine as defined in claim 13, said means for limiting the coil circuit closed time comprising a commutator device including a rotor and a contact for interrupting power flow to the low voltage side of an ignition coil.

16. In an internal combustion engine as defined in claim 15, said ignition system including a distributor joining the high voltage side of an ignition coil to said spark plug.

17. In an internal combustion engine as defined in claim 13, said set of breaker contacts comprising a piston type check valve assembly wherein the sliding piston valve and the valve seat therefor comprise said set of breaker contacts.

18. In an internal combustion engine as defined in claim 13, said set of breaker contacts comprising a ball type check valve assembly wherein the ball check valve and the valve seat therefor comprise the breaker contacts.

19. In an internal combustion engine as defined in claim 12, said means joining said set of contacts to said spark plug comprising an electronic apparatus for triggering an ignition spark between said electrodes of said spark plug.

20. In an internal combustion engine as defined in claim 19, said means joining said set of contacts to said spark plug including a high voltage distributor connected in series between the secondary winding of said ignition coil and said spark plug.

21. In an internal combustion engine as defined in claim 12, said check valve means controlling the flow of fuel through restrictive action thereby to delay closing of said check valve means to provide for a longer open time for said set of breaker contacts.

22. In an internal combustion engine as defined in claim 21, said check valve means comprising a sliding piston type check valve assembly wherein said sliding piston valve and the valve seat therefor comprise said set of breaker contacts.

23. In an internal combustion engine as defined in claim 22, said set of breaker contacts having points resisting deterioration, said points consisting of tungsten.

24. In an internal combustion engine as defined in claim 12, said check valve means comprising a ball type check valve assembly wherein the ball check valve and the valve seat therefor comprise said set of breaker contacts.

25. In an internal combustion engine as defined in claim 12, said means joining said set of breaker contacts to said spark plug comprising an electronic apparatus triggering an ignition spark between said electrodes and said spark plug when contact between said set of breaker contacts is broken, said set of contacts comprising a valve assembly of the ball check valve type wherein the ball check valve and the valve seat therefor comprise said set of breaker contacts.

26. In an internal combustion engine as defined in claim 12, said means joining said set of contacts to said spark plug comprising an electronic apparatus for triggering an ignition spark between said electrodes of said spark plug when contact between said set of contacts is broken, said check valve means comprising a sliding piston type check valve assembly wherein the sliding piston check valve and the valve seat therefor comprise said set of breaker contacts.

27. In an internal combustion engine as defined in claim 26, said sliding piston check valve and said valve seat having breaker contact points resisting deterioration consisting of tungten.

28. In combination, a fuel ignition system for an internal combustion engine and a fuel injection system having a conduit and a set of breaker contacts comprising a check valve assembly housed therein, said fuel ignition system comprising a spark plug having electrodes extending into the combustion chamber of a cylinder of said engine, and means including an ignition coil and a source of power therefor joining said set of breaker contacts to said spark plug whereby an ignition spark is provided between said electrodes when contact between said set of breaker contacts is broken, said means for causing an ignition spark including electronic apparatus which is triggered when contact between said set of breaker contacts is broken, said set of breaker contacts comprising a ball type check valve assembly including a ball type check valve and a valve seat therefor and being responsive to the flow of fuel in said conduit of said injection system.

29. In the combination as defined in claim 28, said means joining said set of breaker contacts to said spark plug including a high voltage distributor connected in series between the secondary winding of said ignition coil and said spark plug.

30. In combination, a fuel ignition system for an internal combustion engine and a fuel injection system comprising a conduit with a set of breaker contacts housed therein, said fuel ignition system having a spark plug with electrodes extending into a combustion chamber of a cylinder of said engine, and means, including an ignition coil and a source of power therefor, joining said set of breaker contacts to said spark plug for providing an ignition spark between said electrodes when contact between said set of breaker contacts is broken, said set of breaker contacts comprising a sliding piston type check valve assembly wherein said sliding piston valve and the valve seat therefor comprise said breaker contacts, and means for causing an ignition spark including electronic apparatus which is triggered when contact between said set of breaker contacts is broken.

31. In the combination as defined in claim 30, said sliding piston valve and said valve seat having breaker contact points resisting deterioration consisting of tungsten.

32. In the combination as defined in claim 30, said means joining said set of breaker contacts to said spark plug including a high voltage distributor connected in series between the secondary winding of said ignition coil and said spark plug.

References Cited in the file of this patent

UNITED STATES PATENTS

| | | |
|---|---|---|
| 2,018,159 | Walker | Oct. 22, 1935 |
| 2,484,009 | Barber | Oct. 11, 1949 |
| 2,628,600 | Malin | Feb. 17, 1953 |
| 2,718,883 | Taylor | Sept. 27, 1955 |